(12) United States Patent
Yoon et al.

(10) Patent No.: US 11,656,741 B2
(45) Date of Patent: May 23, 2023

(54) USER INTERFACE FOR ORTHODONTIC TREATMENT PLAN

(71) Applicant: OrthoSnap Corp., Westbury, NY (US)

(72) Inventors: Michael Yoon, Westbury, NY (US); Yan Pogorelsky, Westbury, NY (US)

(73) Assignee: ORTHOSNAP CORP., Westbury, NY (US)

( * ) Notice: Subject to any disclaimer, the term of this patent is extended or adjusted under 35 U.S.C. 154(b) by 0 days.

(21) Appl. No.: 17/721,429

(22) Filed: Apr. 15, 2022

(65) Prior Publication Data

US 2022/0331063 A1    Oct. 20, 2022

Related U.S. Application Data

(60) Provisional application No. 63/175,739, filed on Apr. 16, 2021.

(51) Int. Cl.

| | | |
|---|---|---|
| *G06F 3/0482* | (2013.01) | |
| *A61C 7/00* | (2006.01) | |
| *G06F 3/04817* | (2022.01) | |
| *G06F 40/177* | (2020.01) | |
| *G06F 3/0486* | (2013.01) | |

(52) U.S. Cl.
CPC .......... *G06F 3/0482* (2013.01); *A61C 7/002* (2013.01); *G06F 3/04817* (2013.01); *G06F 3/0486* (2013.01); *G06F 40/177* (2020.01)

(58) Field of Classification Search
CPC .. G06F 3/04817; G06F 3/0482; G06F 3/0486; A61C 7/002
See application file for complete search history.

(56) References Cited

U.S. PATENT DOCUMENTS

| | | | |
|---|---|---|---|
| 10,675,128 B2 | 6/2020 | Ariza | |
| 2007/0218418 A1* | 9/2007 | Raby | G16H 50/50 |
| | | | 433/24 |
| 2013/0309626 A1* | 11/2013 | Arunachalam | A61C 7/28 |
| | | | 433/24 |
| 2018/0092715 A1* | 4/2018 | Kitching | A61C 7/002 |
| 2020/0000554 A1* | 1/2020 | Makarenkova | A61B 5/1076 |
| 2020/0261186 A1 | 8/2020 | Hunter et al. | |
| 2020/0306011 A1* | 10/2020 | Chekhonin | G16H 50/50 |

FOREIGN PATENT DOCUMENTS

WO    WO-2006100700 A1 *    9/2006    ............... A61C 7/00

* cited by examiner

*Primary Examiner* — Mong-Shune Chung
(74) *Attorney, Agent, or Firm* — Buckley, Maschoff & Talwalkar LLC

(57) ABSTRACT

Orthodontic aligners can be used to help shape a patient's teeth, jaw, and gums. Aligners are designed to move teeth into a desired position. Prior to the treatment, a dental professional will prepare a treatment plan (e.g., a set of aligners, etc.) Each aligner in the set may perform a different action on different subsets of teeth. Many dental professionals use animation software to show the patient an animation/video of the changes that are going to occur to the patient's teeth/jaw over time as a result of the treatment plan. While the animation may visually depict how the teeth and mouth are going to change, it does not tell the patient what is being performed (i.e., the actions that are being taken to move the teeth). As a result, the patient often has a significant number of questions because they are not properly educated on the treatment.

20 Claims, 12 Drawing Sheets

FIG. 1A
UPPER ARCH

| | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Direction | | ↙ 101 | ↙ | ↙ | ↙ | ↙ 102 | | ↙ | ↙ | ↙ | ↙ | | | |
| Attach | | | | | ✚ 103 | | | | ✚ | | | | | |
| IPR | | 104 | | MD.5 | | | | MD.5 | | 105 BT | | | | |
| 0 | | ▨ | | | ▨ | | | | | ╳ | | | | |
| Aligner 1 | | | | | | | | | | ▨ BT ▨ | ▨ | | | |
| Aligner 2 | | ▨ | ▨ | | ▨ | | | | ▨ | ╳ MR ╳ | | | | |
| Aligner 3 | | | | ▨ | | ▨ | | ╳ MR ╳ | | | | | | |
| Aligner 4 | | ▨ | | | ▨ | | | | ▨ | ╳ BT ╳ | ▨ | | | |
| Aligner 5 | | | | ▨ | | ▨ | | | | | | | | |
| Aligner 6 | | | | | | | | | | ╳ MR ╳ | ▨ | | | |

100A

FIG. 1B
LOWER ARCH

| | 31 | 30 | 29 | 28 | 27 | 26 | 25 | 24 | 23 | 22 | 21 | 20 | 19 | 18 |
|---|---|---|---|---|---|---|---|---|---|---|---|---|---|---|
| Direction | | ↙ | ↗ | ↗ | ↖ | ↗ | ↖ | ↙ | ↗ | ↙ | ↙ | ↙ | ↙ | |
| Attach | | | | | | | | | + | | + | | | |
| IPR | | | | MD.25 | MD.25 | MD.25 | MD.25 | MD.25 | MD.25 | | | | |
| 0 | | | | | | | | | | | | | BT | |
| Aligner 1 | | ▓ | | | ▓ | | ▓ | | ▓ | | BT | BT | | |
| Aligner 2 | | | | ▓ | | ▓ | | ▓ | | | | | BT | |
| Aligner 3 | | | | ▓ | | ▓ | | ▓ | | | BT | BT | | |
| Aligner 4 | | | | | ▓ | | ▓ | | ▓ | | | BT | | |
| Aligner 5 | | | | ▓ | | ▓ | | ▓ | | | BT | BT | | |
| Aligner 6 | | | | | ▓ | | ▓ | | ▓ | | | BT | | |

100B

120 FIG. 1C
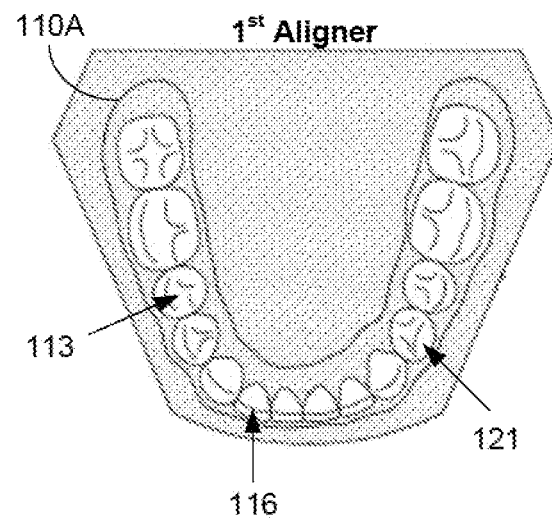
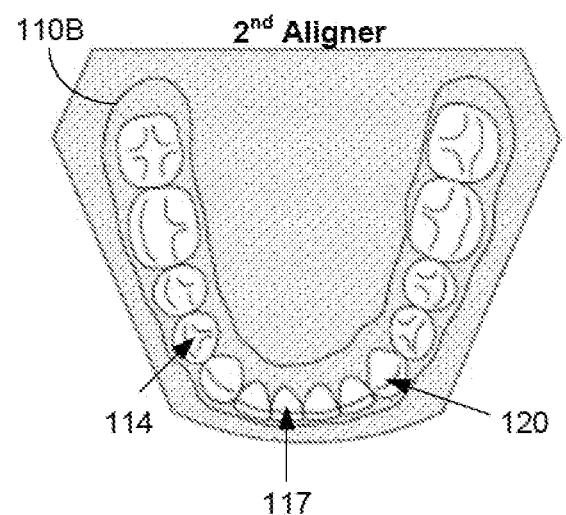
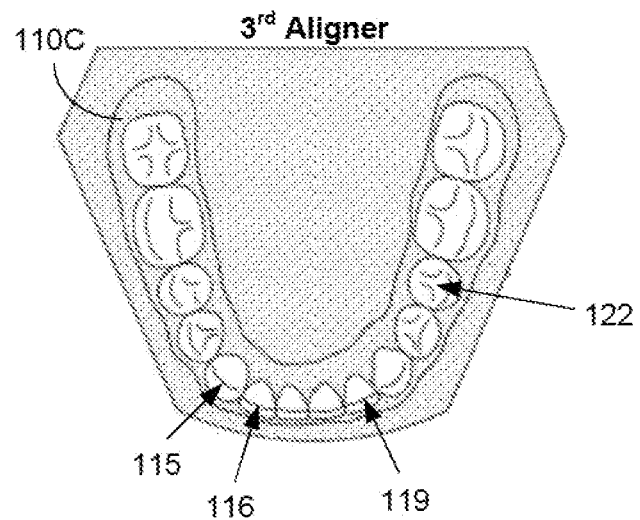

FIG. 3A

| Upper | 1 | 2 | 3 | 4 | 5 | 6 | 7 | 8 | 9 | 10 | 11 | 12 |

KEY

| MR = Rotation | BT = Torque | EXT = Extrusion | INT = Intrusion |
| IPR = Interproximal Reduction | | M = Move | AT = Attachment |

| | | | | | | | |
|---|---|---|---|---|---|---|---|
| Aligner 1 | | | | | | | |
| Aligner 2 | | | | | | | |
| Aligner 3 | | | | | | | |
| Aligner 4 | | | | | | | |
| Aligner 5 | | | | | | | |
| Aligner 6 | | | | | | | |

FIG. 3C

| Upper | 2 | 3 | 4 | 5 | 6 | 7 | 8 | 9 | 10 | 11 | 12 | 13 |
|---|---|---|---|---|---|---|---|---|---|---|---|---|

310

321 — MR = Rotation | BT = Torque | EXT = Extrusion | INT = Intrusion — 322

IPR = Interproximal Reduction | M = Move | AT = Attachment

330

331 — MR

332

| | | | | | | | | | | | | |
|---|---|---|---|---|---|---|---|---|---|---|---|---|
| Aligner 1 | | | | | | | | | | | | |
| Aligner 2 | | | | | | | | | | | | |
| Aligner 3 | | | | | | | | | | | | |
| Aligner 4 | | | | | | | | | | | | |
| Aligner 5 | | | | | | | | | | | | |
| Aligner 6 | | | | | | | | | | | | |

300C

| Upper | 2 | 3 | 4 | 5 | 6 | 7 | 8 | 9 | 10 | 11 | 12 | 13 |
|---|---|---|---|---|---|---|---|---|---|---|---|---|

310

321

KEY

MR = Rotation | BT = Torque | EXT = Extrusion | INT = Intrusion
IPR = Interproximal Reduction | M = Move | AT = Attachment

| | | | | | | | | | | | | |
|---|---|---|---|---|---|---|---|---|---|---|---|---|
| Aligner 1 | MR | | | M | | MR | | M | | | | |
| Aligner 2 | | M | | AT | | M | | M | | | | |
| Aligner 3 | M | | | MR | | | | | IPR | | | | |
| Aligner 4 | | | | | | | | | MR | | | | |

330

333 SUBMIT

UPPER ARCH

| | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Direction | | ↙ | ↙ | ↙ | ↙ | ↙ | | ↘ | ↗ | ↗ | ↗ | | | |
| Attach | | | | + | | | | | | | | | | |
| IPR | | | | | | | | MD.25 | | | | | | |
| 0 | | | | | | | | | | | | | | |
| Aligner 1 | | | | ▓ | | | | | | | | | | |
| Aligner 2 | | MR | | | ▓ | | | | | | | | | |
| Aligner 3 | | | ▓ | | | MR | | | | | | | | |
| Aligner 4 | | | | MR | | | | | MR | | | | | |

300E

USER INTERFACE FOR ORTHODONTIC TREATMENT PLAN

CROSS-REFERENCE TO RELATED APPLICATION(S)

This application claims the benefit under 35 USC § 119 of U.S. Provisional Patent Application No. 63/175,739, filed on Apr. 16, 2021, in the United States Patent and Trademark Office, the entire disclosure of which is incorporated herein for all purposes.

BACKGROUND

Orthodontic aligners are an alternative to traditional metal braces. Orthodontic aligners consist of removable trays, often made of clear plastic material, which fit over the teeth. Because the aligners are typically made of a clear plastic material, the aligners are considered invisible. A typical use case requires a set of aligners which are used in sequence with each aligner in the sequence being worn for several days at a time. The aligners can be designed using state-of-the art techniques based on models and/or images of the teeth. Often, the base molds of the aligners are generated using three-dimensional (3D) printing and trays matching the patient's teeth are then formed on top a the base molds. The aligners work because slight changes provided by the sequence of trays gradually shifts the teeth to a desired place.

Typically, a treatment plan involves an initial set of aligners (e.g., 30-40 aligners, etc.) with each aligner meant to be worn for a few days at a time. The set of aligners is manufactured ahead of time and provided to the patient all at once. Here, the last aligner in the set is the desired perfect outcome of the teeth. However, in many situations, the initial set of aligners does not work. That is, the patient's teeth do not match the last aligner in the set. This is usually caused by previous aligners in the set which have failed to work properly. As a result, the patient must wear a second set of aligners (referred to as a "refinement set." More often than not, the refinement set does not work properly, and the patient must wear another refinement set.

Some of the reasons that aligners do not work properly is that they fail to use "anchoring" properly. Anchoring refers to the process in which the plastic from the aligner uses one tooth as an anchor and drives/pushes another tooth (usually an immediately adjacent tooth). When both the anchor tooth and the adjacent tooth are moving, the anchoring effect does not work properly. Another problem with conventional aligners is that each aligner in the set attempts to gradually and continuously move each tooth. However, by minimally moving a tooth, the movement may not be enough to create a proper compression of the ligament. As a result, the bone remodeling process (i.e., osteogenesis, etc.) may not engage effectively because the compression is not severe enough to activate the necessary enzymes.

Another drawback of traditional treatment plans is how they are explained to the patient. Recently, the trend has been for a clinician (e.g., dentist, etc.) to "show" the patient what will happen to their teeth via an animation or other 3D modeling technique. The visualization typically depicts a starting location of the teeth prior to treatment, and an ending location of the teeth after treatment. In between these two points in the video, the animation shows the teeth moving/morphing from the starting location to the ending location. While the animation may be visually pleasing to the viewer such as the patient, the animation does not provide the patient with any knowledge of what is actually being performed by each aligner and what teeth are affect. Thus, the clinician may not adequately inform the patient as to the treatment and the patient may have many questions that require answers from the clinician.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 1A-1B are diagrams illustrating a user interface displaying an orthodontic aligner treatment plan in accordance with example embodiments.

FIG. 1C is a diagram illustrating a kit with a plurality of aligners according to the orthodontic treatment plan in FIG. 1A in accordance with an example embodiment.

FIGS. 3A-3E are diagrams illustrating a process of interacting with a visual treatment plan via a user interface in accordance with an example embodiment.

Figure 2A:
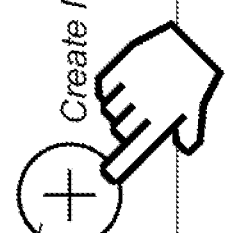
FIGS. 2A-2B are diagrams illustrating a process of initiating a visual treatment plan via a user interface in accordance with example embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Orthodontic aligners are usually clear, plastic trays that fit around a patient's teeth. A set of aligners (e.g., 30-40 aligners) are initially prescribed to a patient by a dentist, orthodontist, or other medical professional. The last aligner in the set is the desired positioning of the patient's teeth. The set of aligners are manufactured all at once and provided to the patient ahead of time. Here, each aligner is meant to be worn in sequence for a short duration (e.g., 10-14 days, etc.). It is then up to the patient to wear the aligners and replace them accordingly.

Orthodontic aligners can be used to help shape a patient's teeth, jaw, and gums. Aligners are constructed to move (e.g., twist, turn, rotate, displace, etc.) teeth into a desired position. In some cases, attachments may be used to help anchor various movements. In addition, one or more teeth may be extracted or the like. Prior to the treatment, a dental professional will prepare a treatment plan (e.g., a set of aligners, etc.) Each aligner in the set may perform a different respective action or actions on a respective subset of teeth. However, rather than bog the patient down with a lengthy description of the individual steps of the treatment plan, such as what each aligner is designed to do, dental professionals use animation software to show the patient an animated video of the changes that are going to occur to the patient's teeth/jaw over time as a result of the treatment plan. While the animation may visually depict how the teeth and mouth are going to move, it does not tell the patient what is being performed to their teeth (i.e., the actions that are being taken to move the teeth). As a result, the patient often has a significant number of questions because they are not properly educated on the treatment.

Orthodontic aligner treatments work in cooperation with a patient's periodontal ligament which moves teeth naturally (e.g., in response to biting, chewing, etc.) The periodontal ligament is an elastic tissue that lies between the tooth and the bone. The periodontal ligament holds the teeth in place with tiny, attached fibers. Furthermore, the periodontal ligament also allows the teeth to move in small increments. When the patient wears an orthodontic aligner (e.g., a plastic aligner), the compression of the tooth (and the corresponding movement) usually happens within the first 15-20 minutes. However, if the tooth is not moved enough by the aligner, compression never happens. When compression does not happen, the osteogenesis process (e.g., bone breakdown and rebuilding) does not happen. As a result, the tooth does not end up in the place it is supposed to end up.

Another issue with current orthodontic aligner treatments is that they oftent try to move all of the teeth at the same time. While this logically makes sense, the results are usually poor. One of the problems caused by this treatment plan is that the anchoring process does not work properly. Anchoring is well-known in orthodontics and involves using one or more teeth as "anchors" for a moving tooth. Anchors (e.g., adjacent teeth) allow the plastic from the aligner to apply pressure to a misaligned tooth in order to correct the tooth's position. However, when multiple adjacent teeth need to be moved at the same time (which is very common), the anchoring process does not work properly because both the anchor tooth and the adjacent tooth are moving. As a result, both teeth end up in unexpected locations due to the movement of the other.

Furthermore, because the set of aligners are manufactured in advance, there is no way to address problems caused during the earlier intervals of the orthodontic aligners. In other words, if the patient's teeth do not move properly in any of the earlier intervals, a snowball effect is created meaning the patient's teeth do not move properly at each of the following intervals. In many situations, a patient is required to wear an additional set of aligners to "refine" the improper positioning from the first set of aligners. Furthermore, one refinement set is often not enough. Thus, the patient must wear multiple refinement sets. These refinement sets create an increased (and typically unexpected) cost to the patient, additional visits to the orthopedist, and additional time/delay.

The example embodiments overcome these drawbacks through the use of a new orthodontic treatment planning method and aligner kit. The orthodontic treatment planning method provides a new user interface and a new visual layout that can be interacted with by a clinician (e.g., a dentist, etc.) to create a two-dimensional (2D) visualization which can be used to educate a patient on the treatment that is going to occur as a result of the treatment plan. The 2D visualization may be implemented during a consent procedure where the clinician provides the patient with the details of the treatment and the patient gives consent. Thus, the 2D visualization may be created by the clinician via a software application on a clinician's computer or accessible via the Internet (e.g., a progressive web application, a mobile application, etc.) and displayed or otherwise transferred to a patient's device (e.g., mobile device, laptop, smart-wearable, etc.)

Meanwhile, the aligner kit may include a group of aligners that selectively move different subsets of teeth at each interval/aligner. That is, rather than move all teeth at each interval/aligner, the treatment plan may selectively move non-sequential subsets of teeth (e.g., intermittently spaced within the mouth, etc.) Furthermore, the example embodiments also provide a user interface that allows a user, such as a medical professional, to build a treatment plan visualization according to example embodiments. The treatment plan visualization, referred to herein as a visual treatment plan, educates the clinical provider and the patient about the type of actions that are going to be performed on the patient's teeth and which teeth are going to be affected in each step of the treatment plan without requiring the clinical provider and the patient to read and comprehend a great deal of description, respectively, such as during a consent procedure.

The visual layout of the orthodontic treatment plan may include a two-dimensional (2D) array of cells, referred to herein as a 2D matrix. Within the array, one dimension is used to represent the individual aligners (e.g., represented by aligner ID) in the plan, and another dimension is used to represents each tooth (e.g., represented by tooth number or other identifier, etc.) The host system described herein may build the visual layout and place identifiers of actions that are going to occur within content areas inside the cells of the 2D matrix corresponding to the teeth that are going to be moved.

The host system can also arrange the identifiers in a row corresponding to the aligner in which such actions are going to occur thereby providing the patient/viewer with an understanding of what actions are going to occur and at what step in the treatment plan, without requiring the patient to read and comprehend a lengthy description. Furthermore, if a plan includes fifty aligners, the host may create a single page or window with all fifty aligners and the actions to be performed displayed within the single page or window.

In some embodiments, rather than move all of the patient's teeth at once during each aligner, the treatment plan may selectively move subsets of teeth at each interval/aligner. In particular, adjacent intervals may be designed to move different non-overlapping subsets of teeth. In this case, the other teeth (the ones that aren't moved) can be used as anchors to the teeth that do move. In addition, the amount of movement can be increased when a tooth is moved, resulting in improved compression of the periodontal ligament. The user interface can be used to depict which teeth will be moving in each round (aligner) in the set of aligners which may be in the dozens.

As an example, a conventional treatment plan may attempt to move a patient's tooth by 0.10 mm at each interval/aligner over 10 sequential intervals with the goal of moving the patient's tooth by a total of 1.0 mm. Meanwhile, the treatment plan of the present application may move the same tooth by 0.25 mm in a first interval, a fourth interval, a seventh interval, and a tenth interval, and hold the tooth in place for the second, third, fifth, sixth, eight, and ninth intervals creating the same amount of movement (1.0 mm) over the ten intervals but with more movement at particular intervals and more holding/refinement than at other intervals in comparison to a conventional treatment plan. The result is improved compression of the periodontal ligament resulting in efficient osteogenesis and a more precise/accurate tooth movement. Furthermore, which teeth are moving, and how they are moving (e.g., type of rotation, amount, direction, etc.) may be displayed on the user interface.

In some cases, additional intervals of aligners may be intentionally added to the orthodontic treatment plan with respect to conventional mechanisms to allow for the combination of selective movement and holding reinforcement/non-movement. However, the treatment plan is much more accurate. As a result, no refinement sets are needed which ultimately saves the patient both time and expense.

Traditional wire and bracket orthodontics is also based on the anchoring principle, however the reciprocal nature of a wire makes this tricky. The practitioner's objective is to isolate force on a specific tooth or tooth group, by using a complex series of bends and calculations of directional forces in order to achieve isolation via counteracting directional force. The biomechanics of wires and brackets are different from that of pre-programmed plastic aligners in that the wires and brackets apply greater force than required to compress the periodontal ligament on the target teeth, and hence there is continuous movement with a continually compressed ligament and a continual process of osteogenesis. Whereas, in the example embodiments, a series of discrete plastic aligners can compress the ligament by an average width of, for example, 0.25 mm, followed by a period of retention. This allows the periodontal ligament to recenter around the new position until the next move. The discrete movements created by the aligner (e.g., during a first interval) combined with the retention period (e.g., during the next several intervals) results in much less occurrence of root resorption with aligners compared to braces.

Therefore, the application of the anchoring technique for clear aligners is different from that of bracket and wires, as clear aligners combine discrete movement, anchorage, and retention, along with the much higher strength of the plastic ridge between three adjacent teeth segments as compared to the overall arch strength of material (wire compared to plastic) of holding a shape over the entire arch. In contrast, current practitioners typically create automated or semi-automated 3D treatment plans that animate and move all the teeth in a single layer by dividing all end movements into equal steps. While this makes sense logically, the end results are often improper movement of the teeth.

The visual representation is foundational because it conveys the important information (positional and sequential) in a manner that supports both the comprehension and construction of the treatment plan superior to the "photorealistic" animation that obscures the important information with superfluous detail. It further lends itself to the consumption of simple instructions in the subsequent manufacturing process applied to the physical manipulation of the teeth model that ensures physical constraints are respected (e.g., a 3D jigsaw puzzle) and optimized (e.g., anchorage, retention sequences, and full compression of the periodontal ligament, etc.) For example, the user interface here may provide a "color by numbers" which greatly reduces the complexity of the production process. It further lends itself to finite "feature definition" in the application of machine learning (model learning) for optimizing moves, similar to machine learning in a game of chess, and transforming a complex machine learning problem into a simpler one. It further lends itself to the construction of visual animation aides where the animation derives from the discrete instructions (e.g. a character costume over a sprite) rather than the animation being or defining the instructions.

Furthermore, the 2D visualization described in the example embodiments may be converted by the software application into manufacturing instructions. As another example, the 2D visualization may be used as an input to a visualization process such as an animation process for a tooth or the user's mouth. Thus, the 2D visualization can be consumed by the software application and used to construct an animation and/or animation aides.

FIG. 1A illustrates a user interface 100A with a visualization of an orthodontic aligner treatment plan in accordance with an example embodiment. Referring to FIG. 1A, the user interface 100A illustrates a sequence of aligners (aligners 1-6) that are to be used on an upper arch of a patient. It should be appreciated that six aligners is just an example, and the treatment plan may include more aligners or less aligners than six aligners. The user interface 100A includes a two-dimensional array of cells. The two dimensions includes a first dimension (Y axis) that represents the individual aligner numbers and a second dimension (X axis) that represents the individual teeth numbers. In this case, the patient does not include wisdom teeth 1 and 16 on their upper arch, therefore only teeth 2-15 are shown. However, the 2D array is not entirely based on aligner numbers. In the example of FIG. 1A, a lower portion of the Y axis is used to represent aligner numbers in the set. In addition, an upper portion of the Y axis includes rows for attachments, interproximal reduction (IPRs), movement direction of the tooth within the mouth, and the like. In some embodiments, one or more rows may be left blank in between the top portion and the bottom portion (associated with aligner numbers) to help visually differentiate the two portions of the user interface 100A. In this example, a row zero (0) is included to provide that extra space.

Here, the upper portion of the user interface 100A includes a plurality of rows including a first row for directions 101 of movement of the teeth, a second row identifying which teeth have attachments 102, a third row identifying teeth that will have interproximal reductions (IPRs) or shavings, a fourth row which represents a zeroth aligner or non-active aligner, and six additional rows representing the first six aligners in a treatment plan to be given to the patient.

In the six rows of aligners, the blank spaces in the cells represent teeth that are held in place statically and not being moved by the aligner. Meanwhile, shaded cells 104 (e.g., gray or some other color) represent teeth that are being moved by a predetermined amount (e.g., 0.25 mm) in a direction as shown by the direction 101. Furthermore, cells 105 with X's therein represent teeth that are being turned. These cells may also include a label that indicates the type of turn/torque movement being applied. Examples of the types of movement include:

EXT=Extrusion
INT=Intrusion
MR=Mesial Rotation

DR=Distal Rotation
L/PT=Lingual/Palatal Torque
BT=Buccal Torque
MT=mesial Torque
DT=Distal Torque In the example of FIG. 1A, teeth 2-15 represent the second through the fifteenth teeth in the upper arch of a person. The first and the sixteenth teeth are missing in this example because these are wisdom teeth that have already been extracted. Furthermore, tooth 8 is an implant. According to various embodiments, the treatment plan selectively chooses a subset of teeth to move with each aligner. Here, aligners 1, 2, 3, 4, 5, and 6, are configured to be worn in sequential order.

When two aligners are next to each other (e.g., to be worn in succession) the two aligners may move different and non-overlapping subsets of teeth. For example, aligner 1 is configured to move teeth 3, 6, and 11, while the other teeth (e.g., teeth 2, 4, 5, 7-10, and 12-15 remain static. In particular, teeth 3 and 6 (represented by shaded cells) are configured to move by 0.25 mm in the directions noted above in the same columns while tooth 11 is configured to turn via a buccal torque (BT). As noted above, the compression of teeth 3, 6, and 11, may happen within the first few minutes (e.g., 20 minutes) while the aligner 1 may be worn for a few days. Here, teeth 2 and 4 may serve as anchors to tooth 3. As another example, tooth 5 may serve as an anchor for tooth 6. Furthermore, teeth 10 and 12 may serve as anchors for tooth 11.

Meanwhile, aligner 2 is configured to move teeth 4, 7, and 10, while the remaining teeth remain statically in place. The teeth that are statically in place in aligner 2 include teeth 3, 6, and 11 that are moved by the aligner 1. In this example, aligner 2 reinforces the movement of teeth 3, 6, and 11, created by aligner 1, and also allows teeth 3, 6, and 11 to be used as anchors for the other teeth that are being moved. reinforcement because the position of teeth 3, 6, and 11, as moved by aligner 1, will be reinforced during aligner 2 (and also aligner 3) thereby enabling the periodontal ligament to fully recenter the position of teeth 3, 6, and 11, after the short compression period (e.g., 20 minutes) they move during the wearing of aligner 1.

As a further example, aligner 3 is configured to move teeth 5, 6, 9, 11, and 12. In particular, teeth 5 and 12 are moved by 0.25 mm in the direction shown in the direction row while teeth 6, 9, and 11 are rotated. Meanwhile, the teeth 4, 7, and 10 which were moved by aligner 2 are not being moved by aligner 3 but are held in place to reinforce the movement that is performed by aligner 2.

Thus, FIG. 1A illustrates a visual depiction of a treatment plan according to various embodiments in which a different subset of teeth are moved at each interval (aligner) rather than moving all of the teeth with each aligner. FIG. 1A also illustrates the user interface 100A showing the visual layout of the treatment plan that is newly provided by the example embodiments.

Furthermore, the remaining rows represent the different aligners that are to be worn in the set of aligners. Here, the rows are vertically arranged based on a sequence in which the aligners are to be worn. For example, aligner 1 is configured to be worn for 3 days, while aligner 2 is configured to be worn right after aligner 1 and for 4 days, etc. Furthermore, cells 104 are shaded to identify teeth that are being moved by an aligner. Meanwhile, cells 105 are crossed-out to identify teeth that are being rotated by an aligner. In this way, a user is easily able to visualize and understand the treatment via the visual layout 100. Furthermore, the visual layout 100 may be fed to a manufacturer equipment such as an automated system that produces the movements on a digital or physical model of the teeth and that uses the visual layout 100 as instructions when manufacturing the interim positions of the teeth model on which the plastic aligners are then formed.

FIG. 1B illustrates another user interface 100B that displays a visual layout of a treatment plan for the same patient as shown in FIG. 1A, however, in this example, the user interface 100B is displaying the treatment plan for the lower arch. The arrangement of the layout and the dimensional array are the same, however, in this example, teeth 18-31 corresponding to the upper arch are shown. Here, teeth 17 and 32 are wisdom teeth that were previously removed. In the examples herein, the upper arch is visualized in the layout of user interface 100A and the lower arch is displayed within the layout of user interface 100B. While the two layouts are shown via two different screens in the examples herein, it should be appreciated that both layouts may be incorporated into one larger visual layout where both layouts are displayed side-by-side with each other such that each row is lined up in both user interfaces 100A and 100B. In other words, the aligner numbers are matched so that both layouts are aligned.

FIG. 1C illustrates a kit of aligners that include aligners 110A, 110B, and 110C that are to be provided to a patient. Here, only three aligners 110A, 110B, and 110C are shown but the kit may include a greater number of aligners (e.g., 20, 25, 30, 40, etc.) In this example, aligner 110A is configured to move a first subset of teeth including teeth 113, 116, and 121 corresponding to the first row shown in FIG. 1A. Meanwhile, aligner 110B is configured to move a second subset of teeth including teeth 114, 117, and 120. Furthermore, aligner 110C is configured to move a third subset of teeth including teeth 115, 116, 119, and 122. In this example, the three aligners 110A, 110B, 110C are configured to be worn in sequential order with each being worn for a predetermined amount of time (e.g., 5 days, etc.) However, the three aligners 110A, 110B, and 110C are configured to move different subsets of teeth, which in this example are non-overlapping subsets of teeth.

Figure 2B:
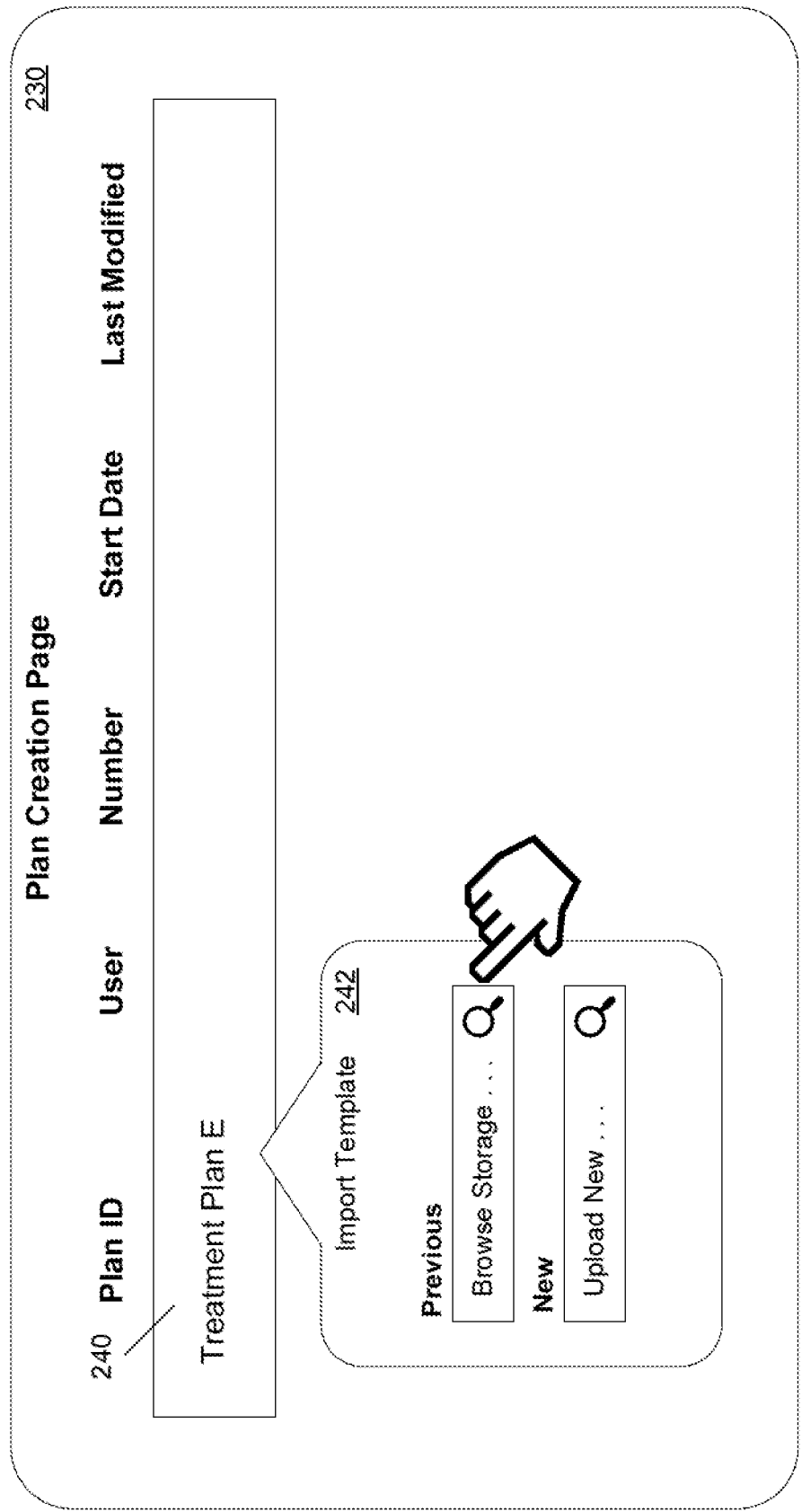

FIGS. 2A-2B illustrate a process of opening a visual treatment plan via a user interface in accordance with example embodiments. Referring to FIG. 2A, there is shown a user interface 200 with a list of existing visual treatment plans that have already been created along with attributes associated with the visual treatment plans such as a unique identifier of the treatment plan assigned by the host system, which in this example may be a software application such as a progressive web application, a mobile application, a desktop application, and the like. In some embodiments, the user interface may also include versioning information as well as last date modified and by who, etc. The software application may be hosted on a local machine, such as a personal computer or a mobile device, tablet, etc. As another example, the software application may be hosted by a server, a cloud platform, a database, or the like, and may be accessible to users via user devices which can access the application via a uniform resource locator (URL) or IP address of the location of the software application hosted by the host platform.

The user may select an existing treatment plan from the user interface 200, such as treatment plan 210 using a pointer/cursor or other input mechanism. Here, the user may update or otherwise modify the existing treatment plan. As another example, the user may select an option 220 to create a new treatment plan. FIG. 2B illustrates a user interface 230 corresponding to another page of the software application. Here, host platform opens/creates a new treatment plan (Plan E) within the software application and creates an underlying database table or other storage structure for storing the content of the new treatment plan. The host platform also displays a record 240 within the user interface 230 which represents the new treatment plan. In this example, the user has selected the record 240 within the user interface. In response, the host platform may output another menu 242 with options for importing an existing template of treatment into the treatment plan. The existing template may be browsed and added from local storage or it may be newly uploaded in a dynamic fashion.

The template may be selected from among a plurality of predefined templates that may also be updated over time. The templates may have a course of treatment (e.g., predefined actions and teeth, etc.) to be treated at each stage (e.g., individual aligner, etc.) of the treatment plan. The host platform may automatically fill-in the record 240 with content from the predefined template. The user may then modify the filled-in content if desired. In addition, the software application may also provide one or more predefined software libraries such as a library for resolving types of malocclusions.

Figure 3B:
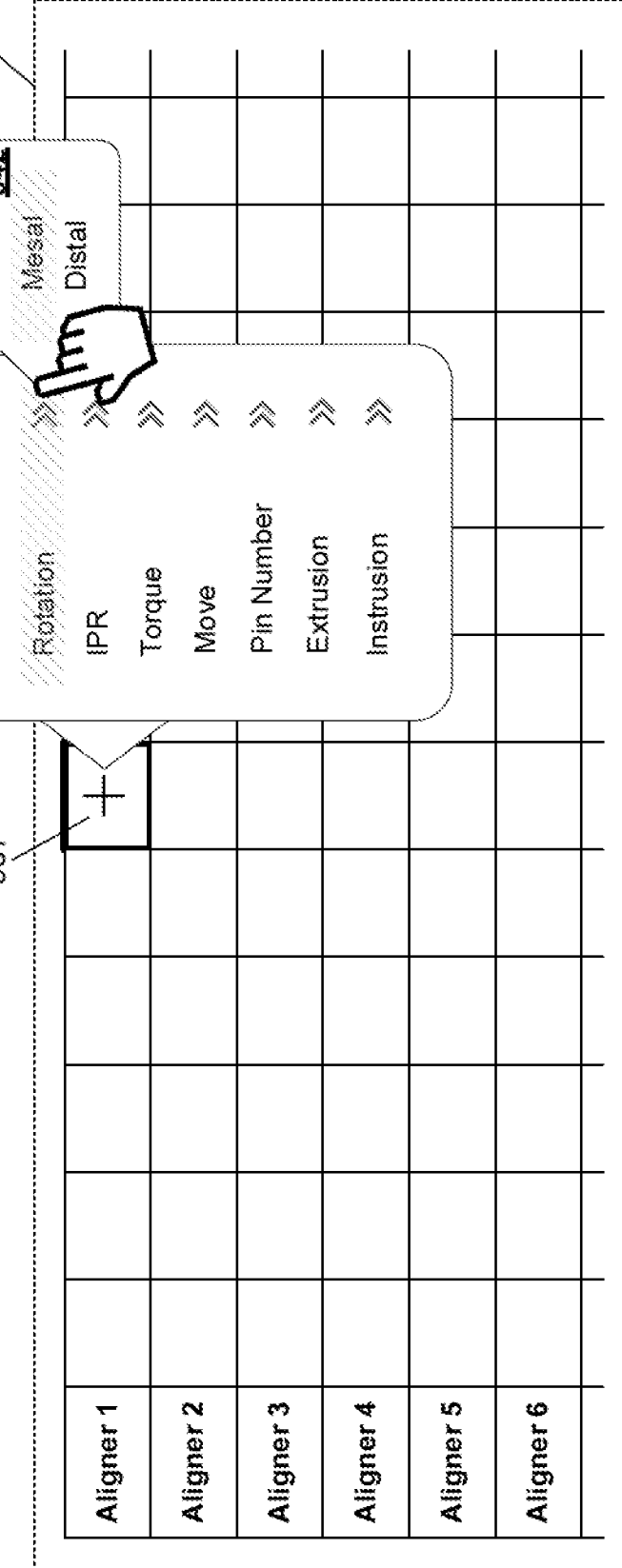

FIGS. 3A-3E illustrate a process of interacting with a visual treatment plan via a user interface in accordance with an example embodiment. In particular, FIGS. 3A-3E describe a process of a user interacting with a visual treatment plan via a user interface, and the steps performed within the user interface by the software application in response to the user interactions. Referring to FIG. 3A, a user interface 300A includes an identification bar 310 with an identifier of a number of teeth of a patient. The user interface 300A also includes a two-dimensional (2D) matrix 330 positioned underneath the identification bar 310 within the user interface 300A. The 2D matrix 330 includes a plurality of rows corresponding to a plurality of aligners in a larger set of aligners, and a plurality of columns corresponding to a plurality of teeth identified by the teeth numbers included in the identification bar 310.

The 2D matrix 330 includes a plurality of cells that represent unique combinations of teeth and aligner number in part. For example, cell 331 corresponds to the sixth tooth and the first aligner in the series of aligners. In addition, the user interface 300A also provides a list of selectable elements 321 such as icons, boxes, images, etc., which represent different actions (e.g., treatment activities, etc.) that can be performed on the teeth. For example, selectable element 321 corresponds to a rotation action (MR) for a tooth. Each selectable element may occupy a separate space on the user interface 300A and can be selected by a user placing the cursor over the element and pressing and holding a drag and drop command while pulling the element towards the cells in the 2D matrix 330. When the user releases the hold, the cell closest to the element is selected and its content area is modified.

In FIG. 3A, a new treatment plan has been initiated corresponding to the new treatment plan selected in FIG. 2B. Here, the user enters input commands via a mouse, finger, stylus, keyboard, speech, gesture, etc. and causes a cursor to select a cell 331 within the 2D matrix 330. In this example, the user does not import an existing template to the 2D matrix 330, but instead starts with a fresh/empty matrix. The user may select any desired number of cells (e.g., one, two, three, four, etc.) using the cursor or other input mechanism. The user may also simultaneously modify each of the selected cells as further described in the example of FIG. 3B.

Referring to FIG. 3B, a user interface 300B is shown. In this example, the user has just selected cell 331 using the cursor. Here, the cell 331 corresponds to the sixth tooth in the first aligner of the set. For example, the user may right-click on the cell 331 or left-click on the cell 331, or some other command. In response to the selection of cell 331, the host may display a menu 340 with actions that can be performed on the selected tooth. The actions may be displayed as selectable actions within the menu 340. In this example, the user has selected selectable action 341 within the menu 340 corresponding to rotation of the tooth. In response, the host may display a sub-menu 342 with an additional request for information such as the type of rotation to perform.

Depending on the action selected from the menu 340, the host may initiate additional menus, sub-menus, input fields, combo boxes, checkboxes, GUI elements, and the like, which can receive additional input from the user for configuring the treatment to a particular tooth. For example, the move selectable action could be selected by the user to define both a direction of movement of a tooth and a distance of movement for the tooth which may be input via a GUI element displaying a set of teeth, a text box, or the like. The user may continue this process throughout the 2D matrix 330 until the user desires to stop. If necessary, the user may select multiple cells at once. In this situation, the host may output just the one menu 340 with the same selectable actions. However, if the user selects one of the selectable actions, it will be applied to all of the teeth selected within the multiple cells.

FIG. 3C illustrates a process of adding additional actions to the treatment plan via a user interface 300C according to another example. In this case, rather than use a menu, the user can simply perform a drag-and-drop operation on any of the icons shown above to add a corresponding action represented by the icon to the treatment plan. In this example, the user pulls a selectable element 321 corresponding to the rotation action from the list of selectable elements to a cell 332 within the 2D matrix corresponding to a third tooth in the upper arch. Here, the selectable elements are displayed in the intermediate section of the screen/page between the identification bar 310 and the 2D matrix 330. In response to the selection, the action corresponding to the selectable element 321 may be inserted within the 2D matrix 330 at the cell 332 to identify that the tooth corresponding to the selected cell 332 is to be rotated during that stage of the treatment.

Figure 3D:
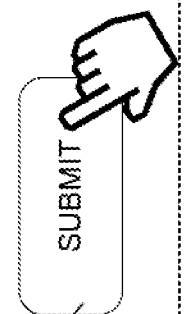

FIG. 3D illustrates a user interface 300D which includes multiple actions which have been added to the 2D matrix 330 for multiple different stages/aligners of the treatment plan. Furthermore, when the user submits the treatment plan, for example, by pressing a predetermined button on the screen 333, or some other action, the host system may convert the 2D matrix 330 shown in FIG. 3D into the visual treatment plan shown in the user interface 300E of FIG. 3E. The visual treatment plan includes a two-dimensional visualization with details about the treatment such as actions which are to be performed at each stage of the treatment, and which teeth will be affected at each stage of the treatment. This type of information cannot be conveyed to the patient through a traditional animation. Therefore, the visual treatment plan described herein provides considerable advantages to a conventional animation because the 2D visualization provides the user with actions performed and teeth affected at each stage.

Figure 4:
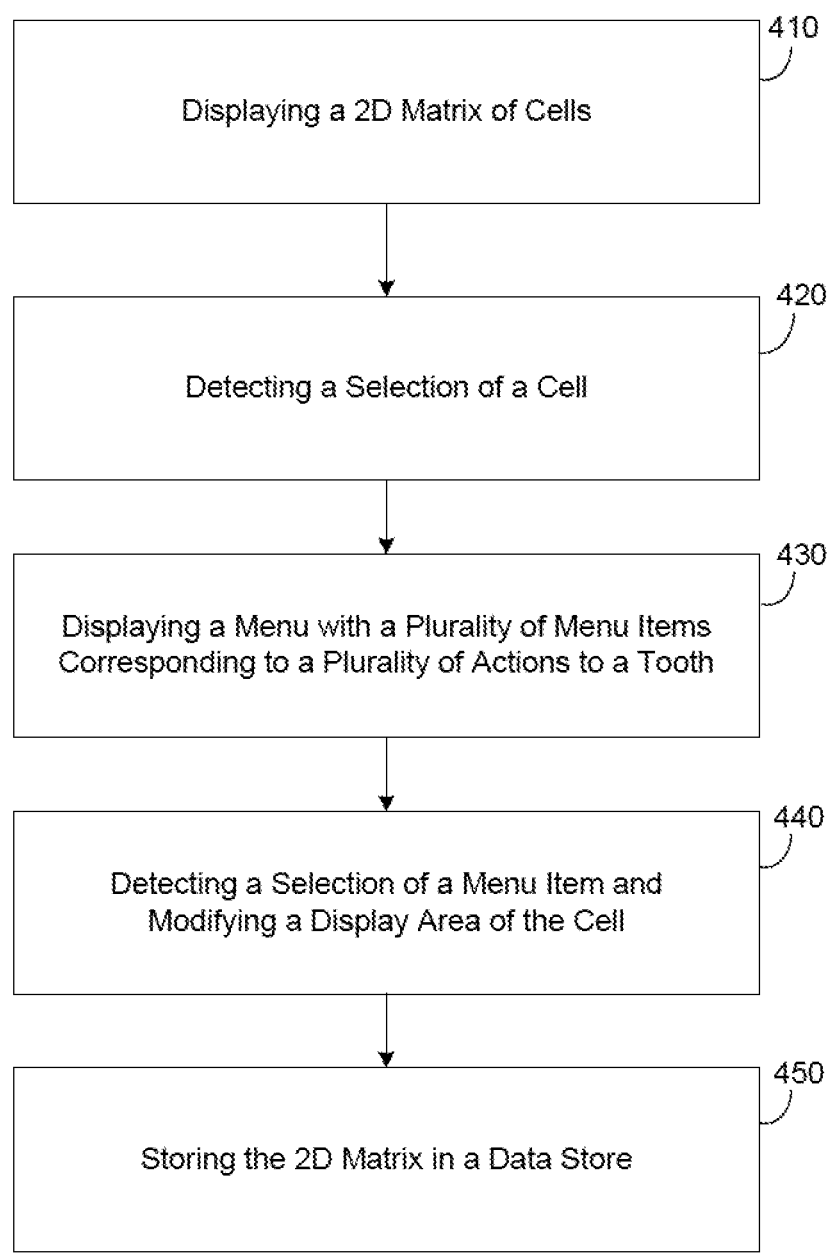
FIG. 4 is a diagram illustrating a method of building an orthodontic treatment plan display in accordance with an example embodiment.

FIG. 4 illustrates a method 400 of building an orthodontic treatment plan display in accordance with an example embodiment. Referring FIG. 4, in 410, the method may include displaying, via a user interface, a two-dimensional (2D) matrix of cells of a treatment plan where a first dimension of the 2D matrix comprises aligner identifiers and a second dimension of the 2D matrix comprises tooth identifiers. In 420, the method may include detecting, via the user interface, a selection of a cell within the 2D matrix. In 430, the method may include displaying, via the user interface, a menu with a plurality of menu items corresponding to a plurality of actions to be performed on a tooth. In 440, the method may include detecting, via the menu displayed within the user interface, a selection of a menu item corresponding to an action from among the plurality of actions and modifying a display area inside the cell within the 2D matrix to include an identifier of the corresponding action. In 450, the method may include storing the 2D matrix within the identifier therein in the data store.

In some embodiments, the method may further include populating an area of the user interface outside of the 2D matrix with a plurality of selectable icons corresponding to the plurality of actions. In some embodiments, the detecting may further include detecting a drag selection of an icon from among the plurality of selectable icons towards a second cell within the 2D matrix, and in response, modifying a display area inside the second cell within the 2D matrix to include an identifier of an action display corresponding to the selected icon from among the plurality of actions. In some embodiments, the detecting may include detecting a selection of a plurality of cells within the 2D matrix, and in response to the selection of the menu item, simultaneously modifying display areas inside each cell among the plurality of cells within the 2D matrix to include the identifier of the corresponding action.

In some embodiments, the displaying the menu may further include displaying a sub-menu in response to a first selection via the menu, and detecting a second selection of the menu item corresponding to the action from the sub-menu. In some embodiments, the identifier of the corresponding action is a text-based identifier, and the method further includes converting the display area of the cell within the 2D matrix from the text-based identifier into one or more of a color and a shading in response to a command submitted via the user interface. In some embodiments, the displaying the 2D matrix may include displaying the 2D matrix in response to at least one of a request to create a new treatment plan and a request to modify an existing treatment plan. In some embodiments, the method may further include receiving the request to create the new treatment plan and an identifier of an existing treatment template, and automatically populating cells within the 2D matrix with actions based on predefined actions designated to the existing treatment template.

Figure 5:
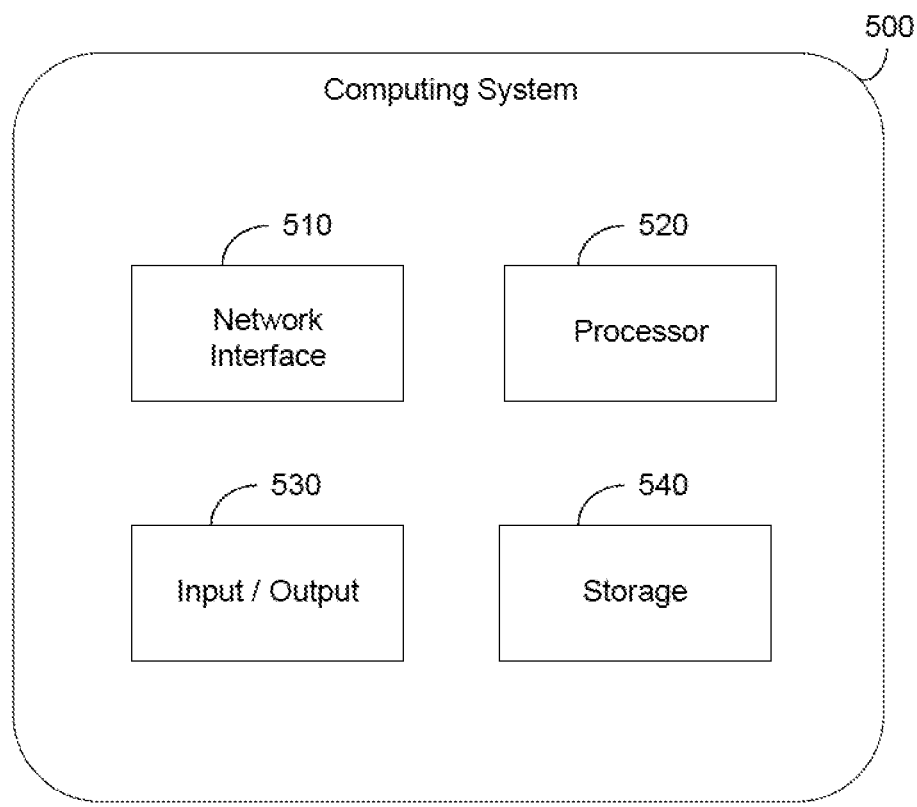
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 4. According to various embodiments, the storage 540 may include a data store that stores data in a two-dimensional structure such as an array, a table, a spreadsheet, a partition, and the like. The storage 540 may be used to store records of treatment plans as described herein.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a data store configured to store treatment plans for orthodontic aligners; and
    a processor configured to:
        display, via a user interface, a two-dimensional (2D) matrix of cells of a treatment plan where a first dimension of the 2D matrix comprises aligner identifiers and a second dimension of the 2D matrix comprises tooth identifiers,
        detect, via the user interface, a selection of a cell within the 2D matrix,
        display, via the user interface, a menu with a plurality of menu items corresponding to a plurality of actions to be performed on a tooth,
        detect, via the menu displayed within the user interface, a selection of a menu item corresponding to an action from among the plurality of actions and modify a display area inside the cell within the 2D matrix to include an identifier of the corresponding action, and
        store the 2D matrix within the identifier therein in the data store.

2. The computing system of claim 1, wherein the processor is further configured to populate an area of the user interface outside of the 2D matrix with a plurality of selectable icons corresponding to the plurality of actions.

3. The computing system of claim 2, wherein the processor is further configured to detect a drag selection of an icon from among the plurality of selectable icons towards a second cell within the 2D matrix, and in response, modify a display area inside the second cell within the 2D matrix to include an identifier of an action display corresponding to the selected icon from among the plurality of actions.

4. The computing system of claim 1, wherein the processor is configured to detect a selection of a plurality of cells within the 2D matrix, and in response to the selection of the menu item, simultaneously modify display areas inside each cell among the plurality of cells within the 2D matrix to include the identifier of the corresponding action.

5. The computing system of claim 1, wherein the processor is configured to display a sub-menu in response to a first selection via the menu, and detect a selection of the menu item corresponding to the action from the sub-menu via a second selection.

6. The computing system of claim 1, wherein the identifier of the corresponding action is a text-based identifier, and the processor is configured to convert the display area of the cell within the 2D matrix from the text-based identifier into one or more of a color and a shading in response to a command submitted via the user interface.

7. The computing system of claim 1, wherein the processor is configured to display the 2D matrix in response to at least one of a request to create a new treatment plan and a request to modify an existing treatment plan.

8. The computing system of claim 7, wherein the processor is configured to receive the request to create the new treatment plan and an identifier of an existing treatment template, and automatically populate cells within the 2D matrix with actions based on predefined actions designated to the existing treatment template.

9. A method comprising:
    displaying, via a user interface, a two-dimensional (2D) matrix of cells of a treatment plan where a first dimension of the 2D matrix comprises aligner identifiers and a second dimension of the 2D matrix comprises tooth identifiers;
    detecting, via the user interface, a selection of a cell within the 2D matrix;
    displaying, via the user interface, a menu with a plurality of menu items corresponding to a plurality of actions to be performed on a tooth;
    detecting, via the menu displayed within the user interface, a selection of a menu item corresponding to an action from among the plurality of actions and modifying a display area inside the cell within the 2D matrix to include an identifier of the corresponding action; and
    storing the 2D matrix within the identifier therein in the data store.

10. The method of claim 9, wherein the method further comprises populating an area of the user interface outside of the 2D matrix with a plurality of selectable icons corresponding to the plurality of actions.

11. The method of claim 10, wherein the detecting further comprises detecting a drag selection of an icon from among the plurality of selectable icons towards a second cell within the 2D matrix, and in response, modifying a display area inside the second cell within the 2D matrix to include an identifier of an action display corresponding to the selected icon from among the plurality of actions.

12. The method of claim 9, wherein the detecting comprises detecting a selection of a plurality of cells within the 2D matrix, and in response to the selection of the menu item, simultaneously modifying display areas inside each cell among the plurality of cells within the 2D matrix to include the identifier of the corresponding action.

13. The method of claim 9, wherein the displaying the menu further comprises displaying a sub-menu in response to a first selection via the menu, and detecting a second selection of the menu item corresponding to the action from the sub-menu.

14. The method of claim 9, wherein the identifier of the corresponding action is a text-based identifier, and the method further comprises converting the display area of the cell within the 2D matrix from the text-based identifier into one or more of a color and a shading in response to a command submitted via the user interface.

15. The method of claim 9, wherein the displaying the 2D matrix comprises displaying the 2D matrix in response to at least one of a request to create a new treatment plan and a request to modify an existing treatment plan.

16. The method of claim 15, wherein the method further comprises receiving the request to create the new treatment plan and an identifier of an existing treatment template, and automatically populating cells within the 2D matrix with actions based on predefined actions designated to the existing treatment template.

17. A non-transitory computer-readable medium comprising instructions that when executed by a processor cause a computer to perform a method comprising:

displaying, via a user interface, a two-dimensional (2D) matrix of cells of a treatment plan where a first dimension of the 2D matrix comprises aligner identifiers and a second dimension of the 2D matrix comprises tooth identifiers;

detecting, via the user interface, a selection of a cell within the 2D matrix;

displaying, via the user interface, a menu with a plurality of menu items corresponding to a plurality of actions to be performed on a tooth;

detecting, via the menu displayed within the user interface, a selection of a menu item corresponding to an action from among the plurality of actions and modifying a display area inside the cell within the 2D matrix to include an identifier of the corresponding action; and storing the 2D matrix within the identifier therein in the data store.

18. The non-transitory computer-readable medium of claim 17, wherein the method further comprises populating an area of the user interface outside of the 2D matrix with a plurality of selectable icons corresponding to the plurality of actions.

19. The non-transitory computer-readable medium of claim 18, wherein the detecting further comprises detecting a drag selection of an icon from among the plurality of selectable icons towards a second cell within the 2D matrix, and in response, modifying a display area inside the second cell within the 2D matrix to include an identifier of an action display corresponding to the selected icon from among the plurality of actions.

20. The non-transitory computer-readable medium of claim 17, wherein the detecting comprises detecting a selection of a plurality of cells within the 2D matrix, and in response to the selection of the menu item, simultaneously modifying display areas inside each cell among the plurality of cells within the 2D matrix to include the identifier of the corresponding action.

* * * * *